(12) United States Patent
Hatta (10) Patent No.: US 12,304,160 B2
(45) Date of Patent: May 20, 2025

(54) METHOD FOR MANUFACTURING HIGH-PRESSURE TANK AND HIGH-PRESSURE TANK

(71) Applicant: TOYOTA JIDOSHA KABUSHIKI KAISHA, Toyota (JP)

(72) Inventor: Ken Hatta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 632 days.

(21) Appl. No.: 17/185,161

(22) Filed: Feb. 25, 2021

(65) Prior Publication Data

US 2021/0299977 A1 Sep. 30, 2021

(30) Foreign Application Priority Data

Mar. 27, 2020 (JP) .................................. 2020-058198

(51) Int. Cl.
*B29C 70/36* (2006.01)
*B29C 39/10* (2006.01)
(Continued)

(52) U.S. Cl.
CPC .............. *B29C 70/36* (2013.01); *B29C 39/10* (2013.01); *B29C 39/123* (2013.01); *B29C 70/542* (2013.01); *B29C 70/682* (2013.01); *F16J 12/00* (2013.01); *F17C 1/02* (2013.01); *F17C 1/16* (2013.01); *B29K 2063/00* (2013.01);
(Continued)

(58) Field of Classification Search
CPC ..... B29C 53/582; B29C 70/36; B29C 70/542; B29C 70/682; B29C 70/32; F16J 12/00; F17C 1/02; F17C 1/16
See application file for complete search history.

(56) References Cited

U.S. PATENT DOCUMENTS 7,204,903 B2 * 4/2007 Yasui ........................ F17C 1/06
156/149
8,038,029 B2 * 10/2011 Lindner .................. B29C 70/32
220/588
(Continued)

FOREIGN PATENT DOCUMENTS

CN         109551778 A     4/2019
DE     10 2018 122 890 A1   3/2019
(Continued)

OTHER PUBLICATIONS

"Electrical Resistivity Data," <https://www.nessengr.com/technical-data/resistivity/> (Year: 2023).*
(Continued)

*Primary Examiner* — Michael A Tolin
*Assistant Examiner* — Hana C Page
(74) *Attorney, Agent, or Firm* — Finnegan, Henderson, Farabow, Garrett and Dunner LLP (57) ABSTRACT

A method for manufacturing a high-pressure tank includes: forming a preform by winding a carbon fiber around a liner to form a fiber layer on an outer periphery of the liner, and impregnating the fiber layer of the preform with a curable resin and curing the curable resin. When winding the carbon fiber around the liner, a metal wire together with the carbon fiber is wound around the liner.

5 Claims, 9 Drawing Sheets

(51) Int. Cl.
  *B29C 39/12*   (2006.01)
  *B29C 70/54*   (2006.01)
  *B29C 70/68*   (2006.01)
  *F16J 12/00*   (2006.01)
  *F17C 1/02*    (2006.01)
  *F17C 1/16*    (2006.01)
  *B29K 63/00*   (2006.01)
  *B29K 305/02*  (2006.01)
  *B29K 307/04*  (2006.01)
  *B29L 31/00*   (2006.01)

(52) U.S. Cl.
  CPC ...... *B29K 2305/02* (2013.01); *B29K 2307/04* (2013.01); *B29L 2031/7156* (2013.01)

(56) References Cited

U.S. PATENT DOCUMENTS

| | | | |
|---|---|---|---|
| 2013/0087567 A1* | 4/2013 | Kaneko | F17C 1/16 242/430 |
| 2015/0329315 A1* | 11/2015 | Hatta | B65H 81/00 242/436 |
| 2017/0044653 A1* | 2/2017 | Pollitt | B29C 70/545 |
| 2017/0167661 A1* | 6/2017 | Yang | B29C 70/326 |
| 2019/0084249 A1 | 3/2019 | Hatta | |
| 2019/0091919 A1 | 3/2019 | Hatta | |

FOREIGN PATENT DOCUMENTS

| | | |
|---|---|---|
| JP | 2008-132717 A | 6/2008 |
| JP | 2012-148544 A | 8/2012 |
| JP | 2018-012235 A | 1/2018 |
| JP | 2019-056415 A | 4/2019 |
| JP | 2019-059176 A | 4/2019 |

OTHER PUBLICATIONS

Hatta (Machine Translation of JP 2012148544) (Year: 2012).*
Nishibe (Machine Translation of JP 2018012235) (Year: 2018).*
Gong (English Translation of KR 20170050862) (Year: 2017).*

* cited by examiner

METHOD FOR MANUFACTURING HIGH-PRESSURE TANK AND HIGH-PRESSURE TANK

CROSS-REFERENCE TO RELATED APPLICATION

This application claims priority to Japanese Patent Application No. 2020-058198 filed on Mar. 27, 2020, incorporated herein by reference in its entirety.

BACKGROUND

1. Technical Field

The present disclosure relates to high-pressure tanks reinforced with a resin-impregnated fiber layer and methods for manufacturing a high-pressure tank.

2. Description of Related Art

High-pressure tanks for fuel cell vehicles have a liner that forms the internal space of the high-pressure tank. A resin-impregnated fiber layer covers the outer surface of the liner to serve as a reinforcing layer, which provides high strength. For example, Japanese Unexamined Patent Application Publication Nos. 2008-132717 (JP 2008-132717 A), 2012-148544 (JP 2012-148544 A), 2018-012235 (JP 2018-012235 A), 2019-056415 (JP 2019-056415 A), and 2019-059176 (JP 2019-059176 A) disclose a method for manufacturing such a high-pressure tank.

JP 2008-132717 A discloses a method for manufacturing fiber-reinforced plastic. In this method, a metal core is covered with fibers and the fibers covering the metal core are impregnated with a matrix resin, or the metal core is covered with fibers impregnated with the matrix resin. Thereafter, the matrix resin is precured by heating and then post-cured by heating at a temperature higher than the heating temperature for the precuring. The metal core is made of a metal having a melting point higher than the heating temperature for the precuring and equal to or lower than the heating temperature for the post-curing.

JP 2012-148544 A discloses a method for manufacturing a high-pressure tank having a stack of fiber layers impregnated in advance with a thermosetting resin. In this method, a coil made of a copper wire etc. is wound around both the inside and outside of the resin layer, and a current is applied to the copper wire to heat a thermosetting resin.

JP 2018-012235 A discloses a method for manufacturing a high-pressure tank having a stack of fiber layers impregnated in advance with a thermosetting resin. In this method, a thin plate made of stainless steel or copper is placed in the fiber layer at a position at the end of winding of the resin fiber. This thin plate is heated to cure the resin.

JP 2019-056415 A discloses a method for manufacturing a high-pressure tank. In this method, a preform, which is composed of a liner defining the internal space of the high-pressure tank and a fiber layer formed on the outer surface of the liner, is placed in a mold. The fiber layer is impregnated with a resin by rotating the preform in the circumferential direction about the central axis of the preform inside the mold while injecting the resin toward the preform placed in the mold.

JP 2019-059176 A discloses a technique of impregnating a formed fiber layer with a resin. In this technique, fiber bundles having different thicknesses are used to form a fiber layer, so that voids are formed in the fiber layer. A resin passing through these voids facilitates permeation of the resin into the fiber layer.

SUMMARY

In resin transfer molding (RTM), a fiber layer of a preform (member composed of a liner and a fiber layer formed thereon) is impregnated with a resin composition and is then cured to form a reinforcing layer. In RTM, uniform resin impregnation is sometimes difficult depending on the thickness and shape of the fiber layer. This problem is significant especially in high-pressure tanks for fuel cell vehicles because a fiber layer for such high-pressure tanks is thick and has a cylindrical shape that is long in the axial direction in order to provide sufficient strength.

Injecting a resin to a preform for such high-pressure tanks at a high pressure may deform a liner etc. due to the pressure or may require a large-scale facility. Impregnating the fiber layer with the resin in a highly fluid state reduces productivity because it takes time to cure the resin.

The present disclosure provides a method for manufacturing a high-pressure tank that can achieve high quality impregnation while restraining reduction in productivity when impregnating a fiber layer with a resin. The present disclosure also provides a high-pressure tank that is manufactured by the manufacturing method.

A first aspect of the present disclosure provides a method for manufacturing a high-pressure tank. The method includes: forming a preform by winding a carbon fiber around a liner to form a fiber layer on an outer periphery of the liner; and impregnating the fiber layer of the preform with a curable resin and curing the curable resin. When winding the carbon fiber around the liner, a metal wire together with the carbon fiber is wound around the liner.

In the above aspect, the carbon fiber and the metal wire may be wound using a single multiple filament winding machine.

In the above aspect, the carbon fiber and the metal wire may be wound by successively passing the liner through a plurality of multiple filament winding machines.

In the above aspect, the metal wire may be made of a metal with a volume resistivity of 5.0 μΩcm or less.

In the above aspect, the metal wire may be made of a metal with a volume resistivity of more than 5.0 μΩcm.

In the above aspect, the metal wire may be placed at a position in the fiber layer, the position being located closer to the liner than a middle position of the fiber layer in a thickness direction.

In the above aspect, a current may be applied to the metal wire after the fiber layer of the preform is impregnated with the curable resin.

In the above aspect, the current may be applied to the metal wire when the curable resin reaches a maximum exothermic curing temperature.

A second aspect of the present disclosure provides a high-pressure tank. The high-pressure tank includes: a hollow liner; and a reinforcing layer including a fiber layer and a resin with which the fiber layer has been impregnated, the fiber layer including a carbon fiber and a metal wire both wound around the liner. The metal wire is placed only at a position in the fiber layer, the position being located closer to the liner than a middle position of the fiber layer in a thickness direction.

According to the present disclosure, high quality impregnation is achieved while restraining reduction in productivity, and a high quality high-pressure tank can be manufactured while reducing manufacturing cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment 1.1. High-Pressure Tank Structure

Figure 1:
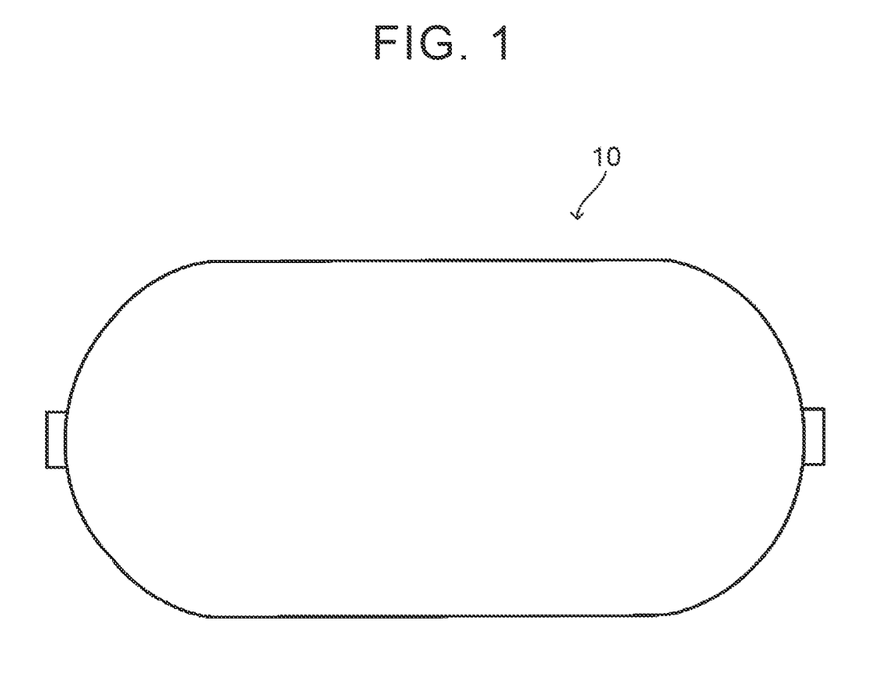
FIG. 1 schematically shows the appearance of a high-pressure tank 10.
Figure 2A:
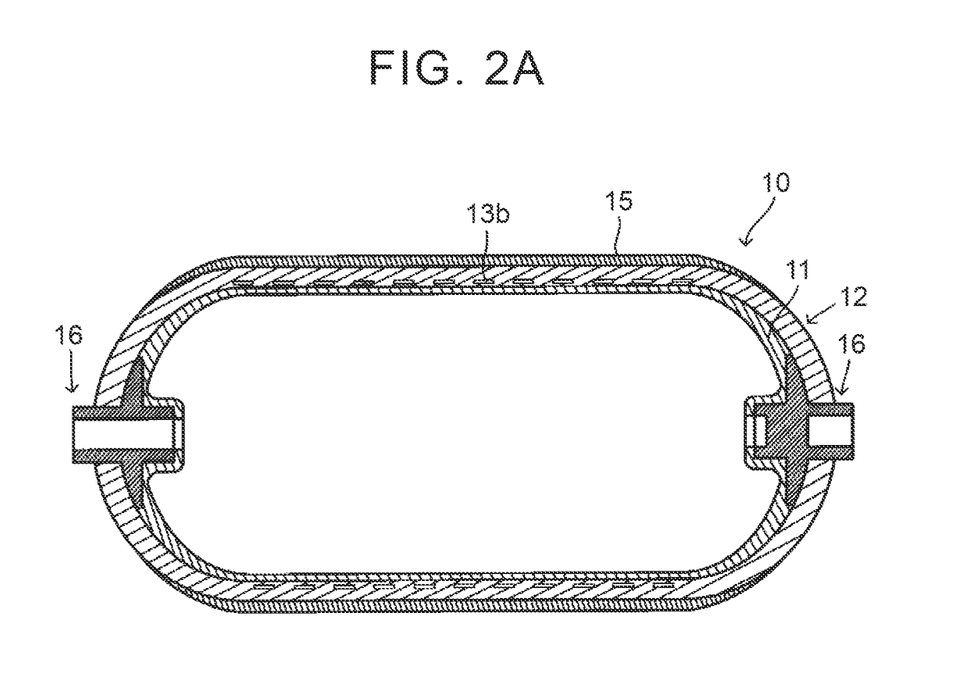
FIG. 2A is a sectional view of the high-pressure tank 10.
Figure 2B:
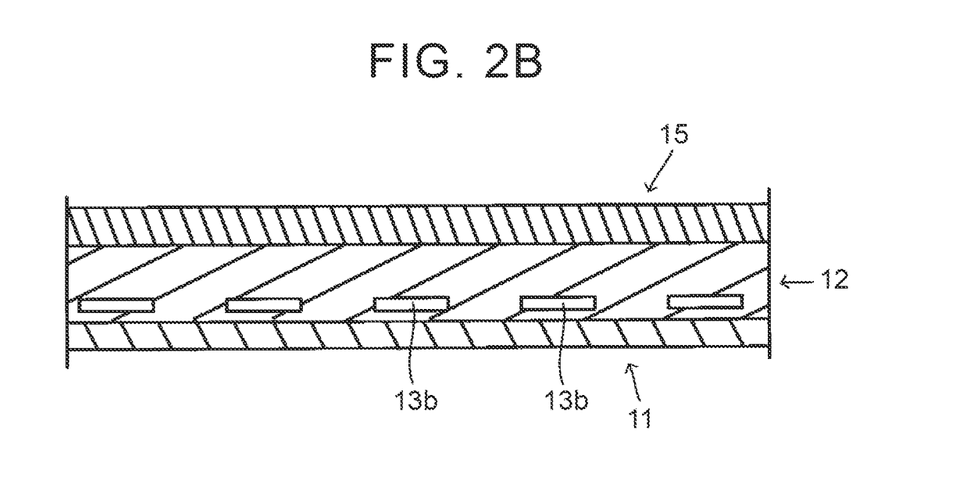
FIG. 2B is a partial enlarged view of the section of the high-pressure tank 10 shown in FIG. 2A.

FIG. 1 schematically shows the appearance of a high-pressure tank 10 according to a first embodiment, and FIG. 2A schematically shows a section of the high-pressure tank 10 taken along an axis. FIG. 2B shows a part of the section of FIG. 2A, illustrating the layer structure of the high-pressure tank 10. As can be seen from these figures, the high-pressure tank 10 includes a liner 11, a reinforcing layer 12, a protective layer 15, and caps 16. The configuration of these components will be described.

Liner

The liner 11 is a hollow member that defines the internal space of the high-pressure tank 10. The liner may be made of any material that can hold the contents (e.g., hydrogen) of the internal space without leaking, and a known material can be used. Examples of the material include nylon resins, polyethylene synthetic resins, and metals such as stainless steel and aluminum. The thickness of the liner 11 is not particularly limited, but is preferably 0.5 mm to 1.0 mm.

Reinforcing Layer

The reinforcing layer 12 includes a fiber layer 13 and a resin with which the fiber layer 13 has been impregnated and cured. The fiber layer 13 is composed of a fiber bundle 13a wound around the liner 11 in multiple layers to a predetermined thickness and a metal wire 13b wound around a part of the layer of the fiber bundle 13a. The thickness of the reinforcing layer 12 is about 10 mm to 30 mm, although it is determined by the required strength and is not particularly limited. Especially, high-pressure tanks for fuel cell vehicles are required to have a thick reinforcing layer for sufficient strength. The high-pressure tanks for fuel cell vehicles therefore have a thick fiber layer, and it is difficult to impregnate the fiber layer with a resin. A half of the thickness of the fiber layer 13 on the liner 11 side is also referred to as the "inner layer side," and the opposite (outer) half of the thickness of the fiber layer 13 from the liner 11 is also referred to as the "outer layer side." The fiber bundle 13a of the fiber layer 13 is composed of carbon fibers.

The fiber bundle 13a is a carbon fiber strip formed by bundling carbon fibers together and having a predetermined sectional shape (e.g., a rectangular section). Specifically, the sectional shape is, but not particularly limited to, a rectangle with a width of about 6 mm to 9 mm and a thickness of about 0.1 mm to 0.15 mm. For example, the number of carbon fibers in the fiber bundle 13a is, but not particularly limited to, about 36,000. Such a carbon fiber bundle 13a is wound around the liner 11 to form the fiber layer 13.

The metal wire 13b of the fiber layer 13 is made of a conductive metal, and particularly a metal with low electrical resistance because, in the present embodiment, a current is applied to the metal wire 13b to induction-heat the carbon fibers of the fiber bundle 13a as will be described later. Specifically, the metal for the metal wire 13b is preferably a material that is usually used for conductive wires and that has a volume resistivity of 5.0 μΩcm or less at 100° C., such as copper.

Figure 3A:
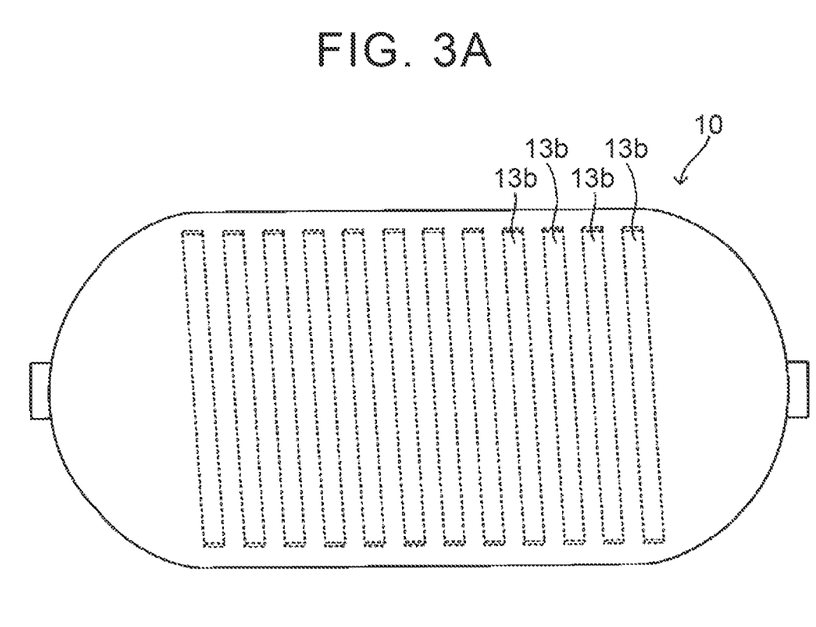
FIG. 3A is a diagram illustrating arrangement of a metal wire 13b.
Figure 3B:
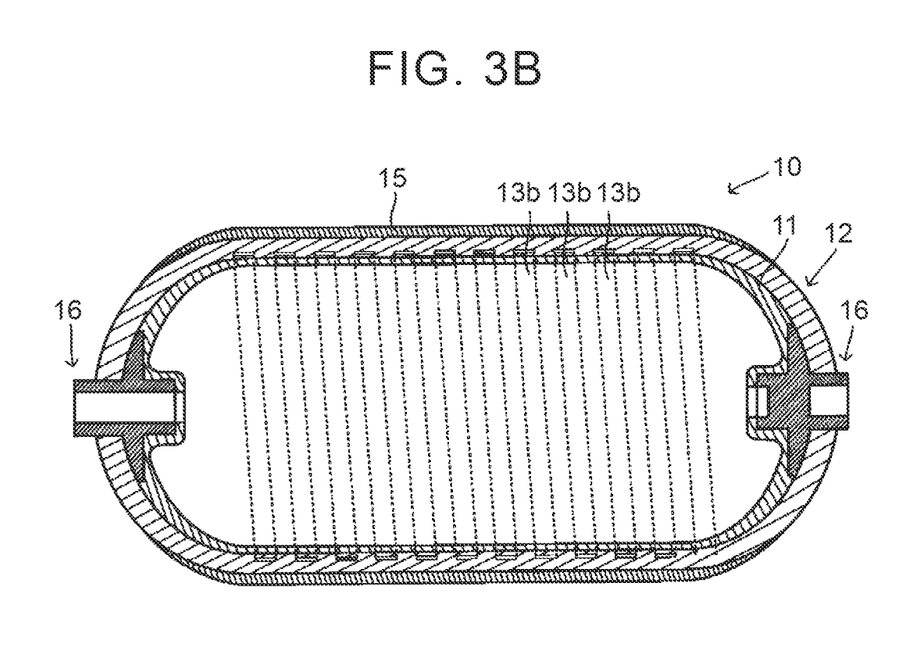
FIG. 3B is another diagram illustrating the arrangement of the metal wire 13b.
Figure 4:
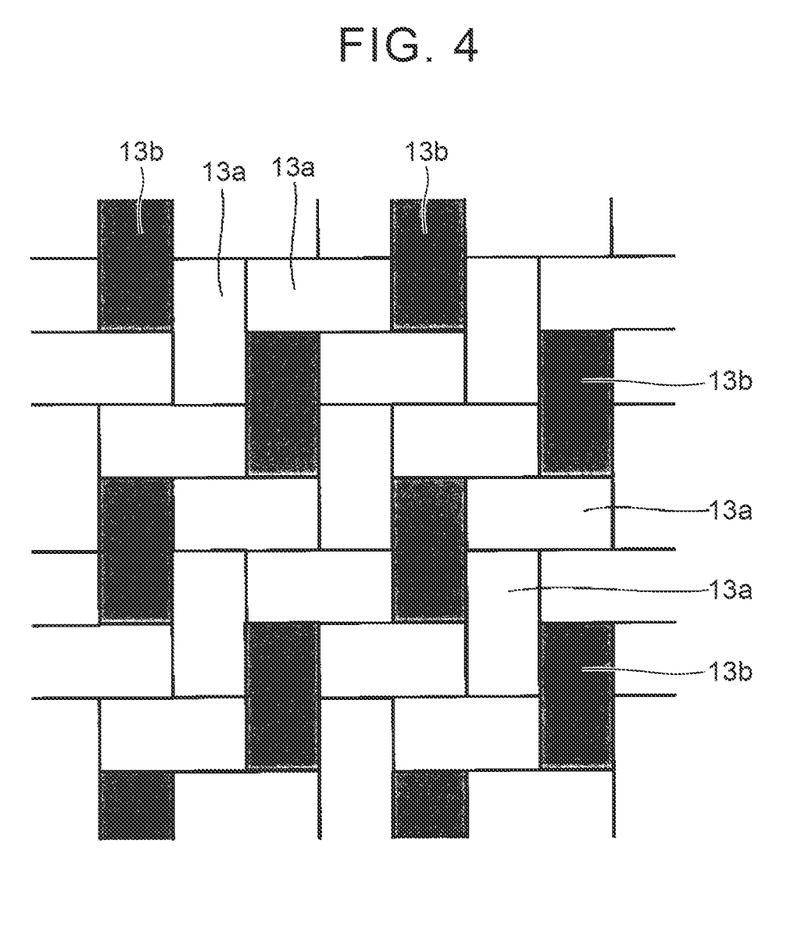
FIG. 4 illustrates how the metal wire 13b is wound.

The metal wire 13b is placed in the inner layer side of the fiber layer 13 and is preferably placed in the layer closest to the liner 11 (the first layer, a layer in contact with the liner 11). FIGS. 3A and 3B schematically show the metal wire 13b wound around the liner 11 by hidden outlines. Since the metal wire 13b is placed in the inner layer side of the fiber layer 13 as described above, the metal wire 13b cannot be seen from the outside. However, the metal wire 13b is shown by dashed lines in FIGS. 3A and 3B for convenience. FIG. 3A shows the appearance of the high-pressure tank 10, and FIG. 3B shows a section of the high-pressure tank 10. FIG. 4 is a plan view of the metal wire 13b wound together with the fiber bundle 13a, as viewed from the outside. As can be seen from these figures, the metal wire 13b is wound into a helical coil shape around the liner 11. The carbon fibers of the fiber layer 13 can therefore be induction-heated by applying a current thereto, as will be described later. As can be seen from FIG. 4, the metal wire 13b is wound so as to alternately pass over and under adjacent fiber bundles 13a like weaving. The sectional shape of the metal wire 13b is not particularly limited and may be the same as or different from that of the fiber bundle 13a. It is preferable that the winding angle of the fiber bundle 13a and the winding angle of the metal wire 13b be equal (in phase). The carbon fibers can thus be more effectively heated by the metal wire.

The metal wire 13b need only be placed at least in the inner layer side. The metal wire 13b may be placed only in the inner layer side. This configuration facilitates curing of the resin as the outer layer side of the fiber layer 13 impregnated with the resin is efficiently heated by a mold and the inner layer side thereof is efficiently heated by current application to the metal wire 13b, as will be described later.

The resin with which the fiber layer 13 has been impregnated and cured in the reinforcing layer 12 is not particularly limited as long as the resin can first permeate the fiber layer 13 while in a fluid state and then be cured by some method to increase the strength of the fiber layer 13. Examples of the resin include thermosetting resins that are cured by heat, such as epoxy resins, unsaturated polyester resins, etc.

containing an amine or anhydride-based curing accelerator and a rubber-based strengthening agent. Other examples of the resin include resin compositions that contain an epoxy resin as a base resin and that are cured by adding a curing agent thereto. In this case, the resin composition is automatically cured by mixing the base resin and the curing agent and causing the mixture, namely the resin composition, to reach and permeate the fiber layer by the time the mixture is cured.

Protective Layer

The protective layer 15 is placed on the outer periphery of the reinforcing layer 12. The protective layer 15 is a layer formed by winding glass fibers around the reinforcing layer 12 and impregnating the resultant glass fiber layer with a resin. The resin with which the protective layer 15 is impregnated can be the same as that of the reinforcing layer 12. The high-pressure tank 10 can thus have impact resistance. The thickness of the protective layer 15 is not particularly limited, but may be about 1.0 mm to 1.5 mm.

Cap

The caps 16 are members attached to two open ends of the liner 11. One of the caps 16 functions as an opening for communication between the inside and outside of the high-pressure tank 10 and functions as an attachment part for attaching a pipe or a valve to the high-pressure tank 10. The caps 16 also function as attachment portions for attaching the liner 11 to a multiple filament winder, which will be described later, when forming the reinforcing layer 12.

1.2. Preform Structure

A preform 30 is an intermediate member that will eventually become the high-pressure tank 10. The preform 30 is composed of at least the liner 11 and the fiber layer 13. The preform 30 is therefore a member before the fiber layer 13 of the reinforcing layer 12 is impregnated with the resin. The configurations included in the preform 30 are therefore similar to those described above, and description thereof will be omitted. Although the preform 30 described herein is the liner 11 with the fiber layer 13 placed thereon, the preform 30 may be the liner 11 with the glass fibers for the protective layer 15 further placed on the fiber layer 13.

1.3. First Manufacturing Method

Figure 5:
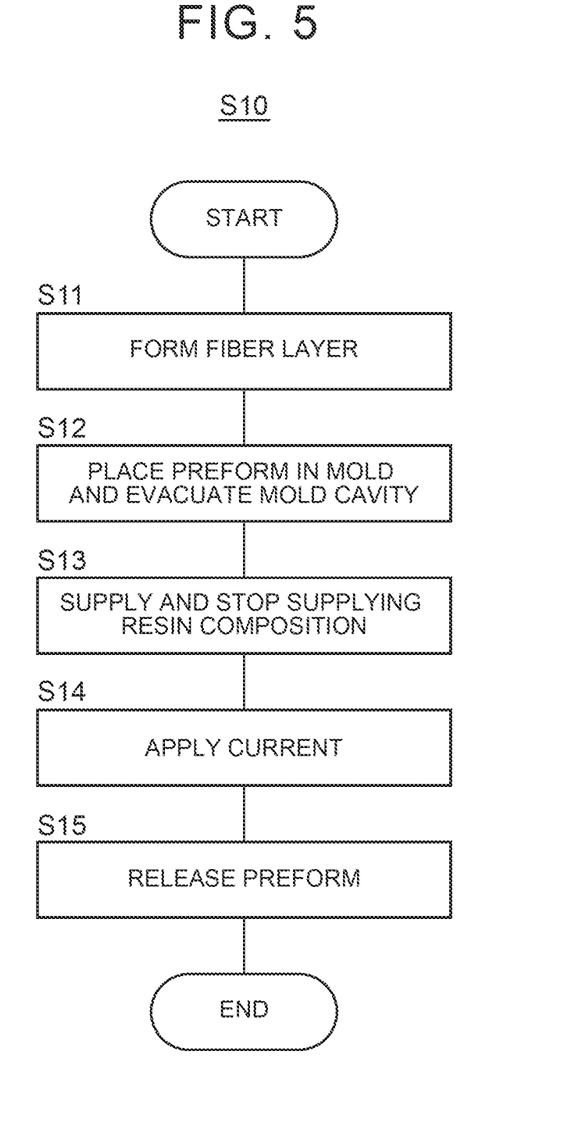
FIG. 5 is a flowchart of a high-pressure tank manufacturing method S10.

FIG. 5 is a flowchart of a high-pressure tank manufacturing method S10 according to one embodiment. As can be seen from FIG. 5, the high-pressure tank manufacturing method S10 includes step S11 of forming a fiber layer, step S12 of placing a preform in a mold and evacuating a mold cavity, step S13 of supplying and stopping supplying a resin composition, step S14 of applying a current, and step S15 of releasing the preform. These steps will be described.

Step S11 of Forming Fiber Layer

Figure 6A:
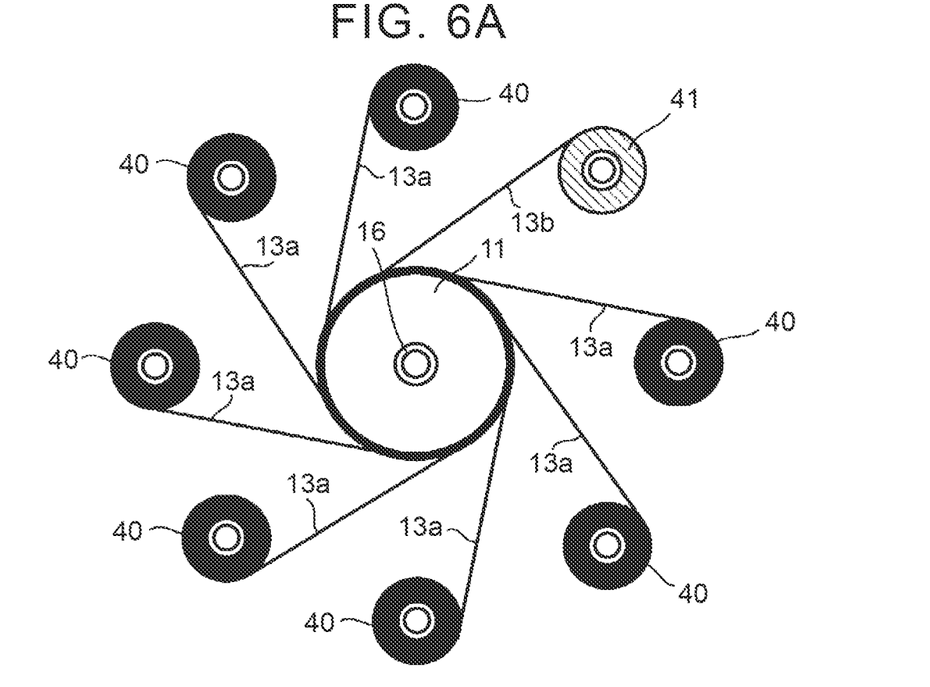
FIG. 6A is a diagram illustrating step S11 of forming a fiber layer.
Figure 6B:
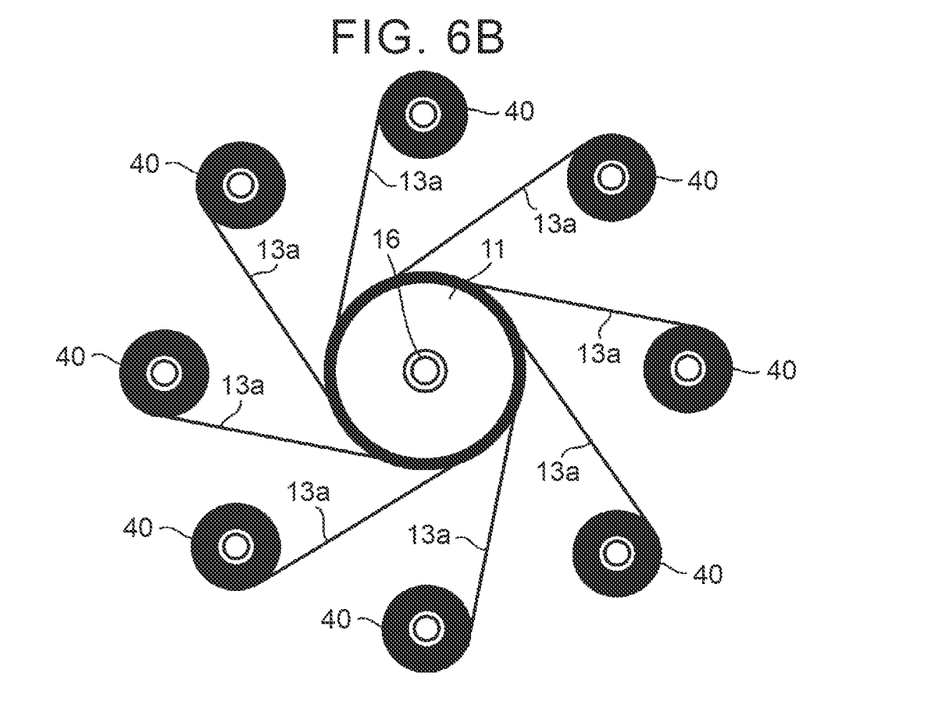
FIG. 6B is another diagram illustrating step S11 of forming a fiber layer.

In step S11 of forming a fiber layer (hereinafter also referred to as "step S11"), the fiber layer 13 is formed on the outer periphery of the liner 11 to produce the preform 30. FIGS. 6A and 6B illustrate step S11. FIG. 6A schematically illustrates the fiber bundle 13a and the metal wire 13b being wound to form a layer including the metal wire 13b, and FIG. 6B schematically illustrate the fiber bundle 13a being wound to form a layer not including the metal wire 13b.

As can be seen from FIGS. 6A and 6B, in the present embodiment, the fiber layer 13 is formed by a filament winding process. In the present embodiment, the fiber layer 13 is formed using a single multiple filament winder (hereinafter also referred to as the "multiple FW machine") having a plurality of fiber bundle bobbins 40 arranged around the outer periphery of the liner 11. The fiber bundle bobbins 40 are bobbins with the fiber bundle 13a wound thereon.

More specifically, as shown in FIG. 6A, when forming a layer including the metal wire 13b by the multiple FW machine having the fiber bundle bobbins 40 arranged around the liner 11, at least one of the fiber bundle bobbins 40 is replaced with a metal wire bobbin 41 that is a bobbin with the metal wire 13b wound thereon. The fiber bundle 13a and the metal wire 13b are sequentially fed from the fiber bundle bobbins 40 and the metal wire bobbin 41 and wound around the liner 11. The winding method is a known method, but at least the metal wire 13b is wound into a helical coil shape as described above. Since the metal wire 13b is placed in the inner layer side of the fiber layer 13 located close to the liner 11 as described above, the winding with the bobbins including the metal wire bobbin 41 is performed in the early stage of the winding process (at the beginning of the winding process when the innermost layer is the layer including the metal wire 13b).

As shown in FIG. 6B, when forming a layer not including the metal wire 13b, all the bobbins of the multiple FW machine are the fiber bundle bobbins 40, and the fiber bundle 13a is sequentially fed from the fiber bundle bobbins 40 and wound around the liner 11. The winding method is a known method. The multiple FW machine can be changed from the state of FIG. 6A to the state of FIG. 6B by merely replacing the metal wire bobbin 41 with the fiber bundle bobbin 40.

The number of bobbins that can be attached simultaneously to the multiple FW machine is not particularly limited. For example, 48 bobbins can be attached to some multiple FW machine. When forming a layer including the metal wire 13b using such a multiple FW machine, the winding can be performed with 47 fiber bundle bobbins 40 and a single metal wire bobbin 41 arranged around the liner 11.

The glass fibers for the protective layer 15 may then be wound around the fiber layer 13.

Step S12 of Placing Preform in Mold and Evacuating Mold Cavity

In step S12 of placing the preform 30 in a mold and evacuating a mold cavity (hereinafter also referred to as "step S12"), the preform 30 produced in step S11 is placed in a mold, and a mold cavity is evacuated. This evacuation facilitates permeation of a resin composition into the fiber layer 13. The fiber layer 13 is thus more smoothly impregnated with the resin composition.

Figure 7A:
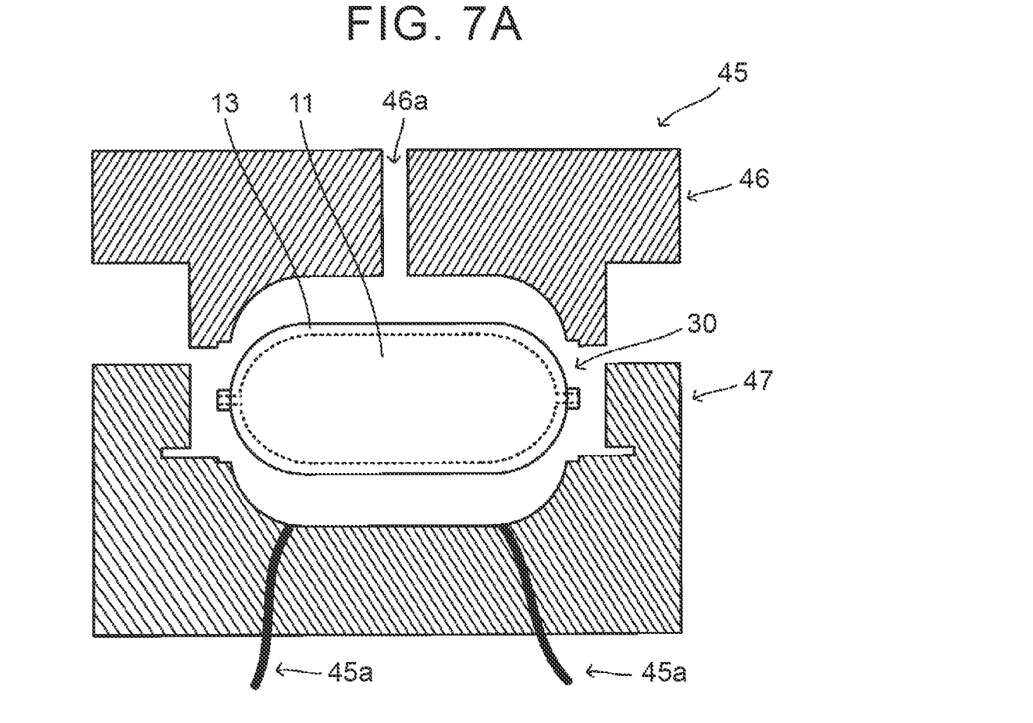
FIG. 7A is a diagram illustrating a mold 45.
Figure 7B:
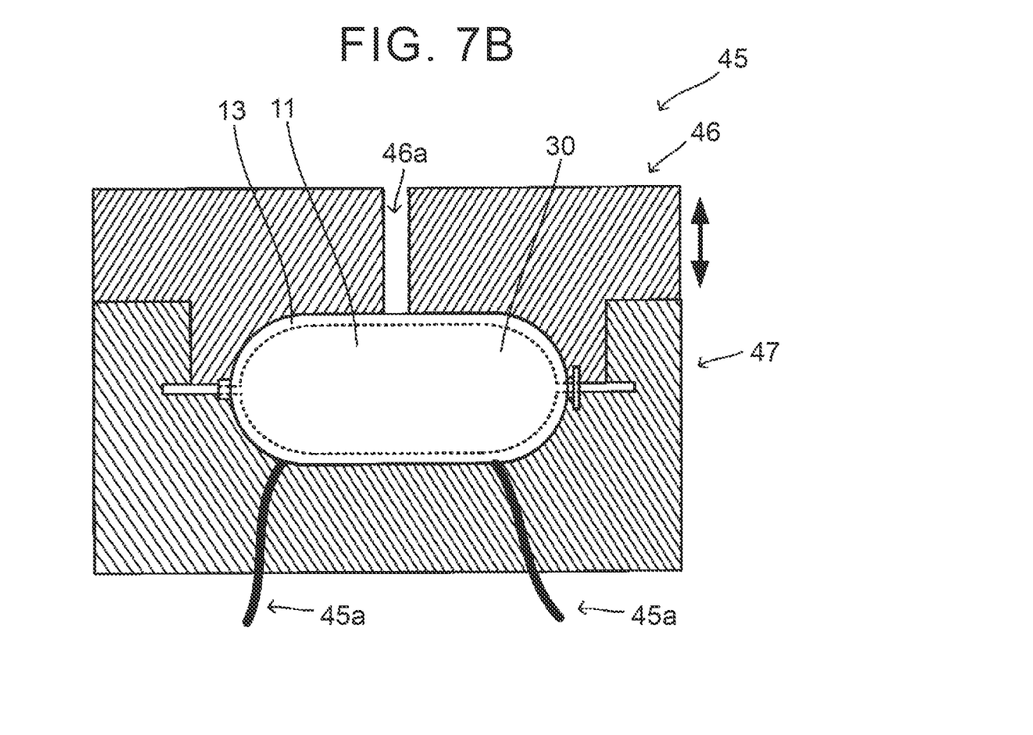
FIG. 7B is another diagram illustrating the mold 45.

FIGS. 7A and 7B illustrate a mold 45. FIG. 7A is a schematic exploded section of the mold 45 shown together with the preform 30, and FIG. 7B is a schematic section of the mold 45 with the preform 30 placed therein. The mold 45 is a mold for impregnating the fiber layer 13 of the preform 30 with a resin. In the present embodiment, the mold 45 has an upper mold 46 and a lower mold 47. By closing the upper mold 46 and the lower mold 47, the cavity that conforms to the shape of the preform 30 is formed inside the mold 45. This cavity can be evacuated to form a sealed space.

The upper mold 46 can move relative to the lower mold 47 as shown by a straight arrow in FIG. 7B. Accordingly, the preform 30 can be placed in the mold 45 and removed (released) from the mold 45.

The upper mold 46 has a flow path 46a that extends from the outside to the fiber layer 13 of the preform 30 placed in the mold 45. The resin composition is introduced into the flow path 46a to supply the resin composition to the fiber layer 13 and impregnate the fiber layer 13 with the resin composition. The mold 45 further has an air flow passage, not shown, for evacuating the cavity of the mold 45.

The mold 45 is provided with current application connection terminals 45a so that a current can be applied to the metal wire 13b in the fiber layer 13 of the preform 30.

The mold 45 is configured so that it can keep the temperature of the mold at a desired temperature by a temperature control device, not shown.

Although the material for the mold 45 is not particularly limited, the mold is preferably made of a metal like typical molds, and the mold 45 is a metal mold.

In step S12, the mold 45 is opened by separating the upper mold 46 from the lower mold 47. The preform 30 is placed on the lower mold 47 with its upper surface exposed to a large extent. The upper mold 46 is then placed over the lower mold 47 and the preform 30 placed thereon, and the mold 45 is closed. The cavity of the mold 45 is then evacuated with a vacuum pump. The evacuation is finished before the resin composition is supplied to the fiber layer 13 in the subsequent step.

Step S13 of Supplying and Stop Supplying Resin Composition

Figure 8:
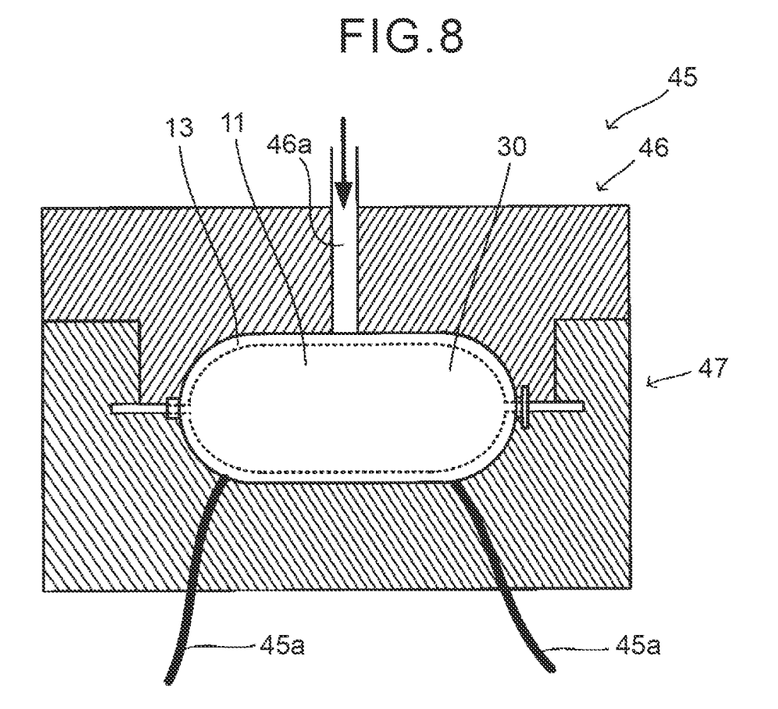
FIG. 8 illustrates step S13 of supplying or stopping supplying a resin composition.

In step S13 of supplying and stopping a resin composition (hereinafter also referred to as "step S13"), the resin composition before curing is supplied to the fiber layer 13 of the preform 30 placed in the mold 45, and the supply is stopped once a required amount of resin composition is supplied. The fiber layer 13 is thus impregnated with the resin composition.

The resin composition is not particularly limited as long as it can reach and permeate the fiber layer while in a fluid state and then be cured by some method to increase the strength of the fiber layer. Examples of the resin composition include thermosetting resins that are cured by heat, such as epoxy resins, unsaturated polyester resins, etc. containing an amine or anhydride-based curing accelerator and a rubber-based strengthening agent. Other examples of the resin composition include resin compositions that contain an epoxy resin as a base resin and that are cured by adding a curing agent thereto. In this case, the resin composition is automatically cured by mixing the base resin and the curing agent and causing the mixture, namely the resin composition, to reach and permeate the fiber layer 13 by the time the mixture is cured.

As will be described later, in the present disclosure, a current is applied to the metal wire 13b to induction-heat the carbon fibers of the fiber layer 13. This accelerates the curing of the resin composition. Accordingly, in step S13, the resin composition in a highly fluid state is supplied to the fiber layer 13 so that the fiber layer 13 can be more quickly and reliably impregnated (quickly impregnated to the layer in contact with the liner 11) with the resin composition.

Step S14 of Applying Current

Figure 9:
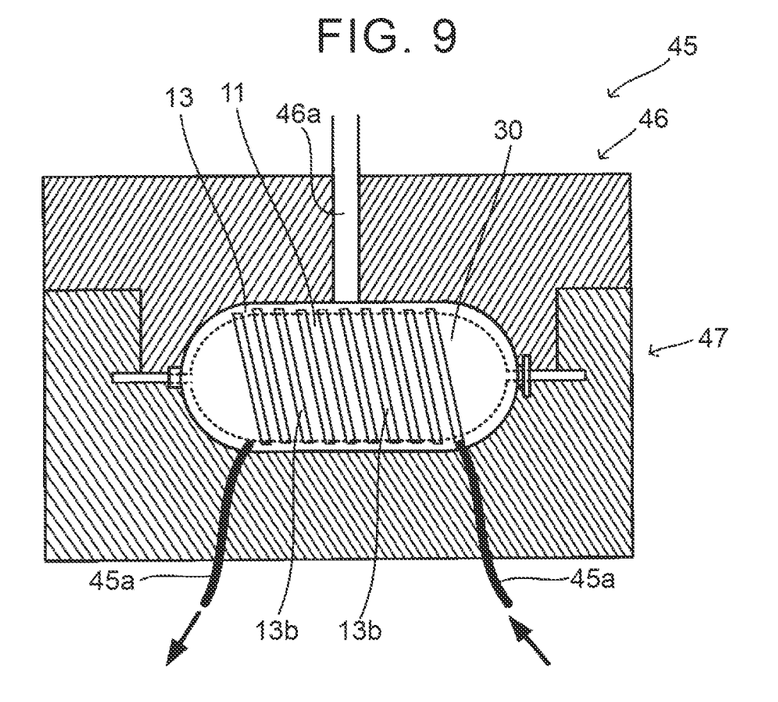
FIG. 9 illustrates step S14 of applying a current.

In step S14 of applying a current, as shown in FIG. 9, a current is applied to the metal wire 13b in the fiber layer 13 using the current application connection terminals 45a. As a result, the metal wire 13b that functions as a heating coil induction-heats the carbon fibers, which is an inductive material forming the fiber bundle 13a, accelerating the curing.

The inner layer side of the fiber layer 13 located close to the liner 11 tends to be cured slowly as it takes time for heat from the mold 45 to be conducted to the inner layer side of the fiber layer 13. However, since the metal wire 13b is placed in the inner layer side of the fiber layer 13, the inner layer side of the fiber layer 13 is heated by applying a current to the metal wire 13b. The curing is thus accelerated. Even though the resin composition is supplied under a highly fluid condition in order to impregnate the fiber layer 13 more smoothly with the resin composition in step S13, the curing is facilitated by applying a current in step S14. Accordingly, both the impregnation rate and the curing rate are increased, which improves productivity of the high-pressure tank. Moreover, the quality of the high-pressure tank is high enough as more reliable impregnation and curing are achieved.

Figure 10:
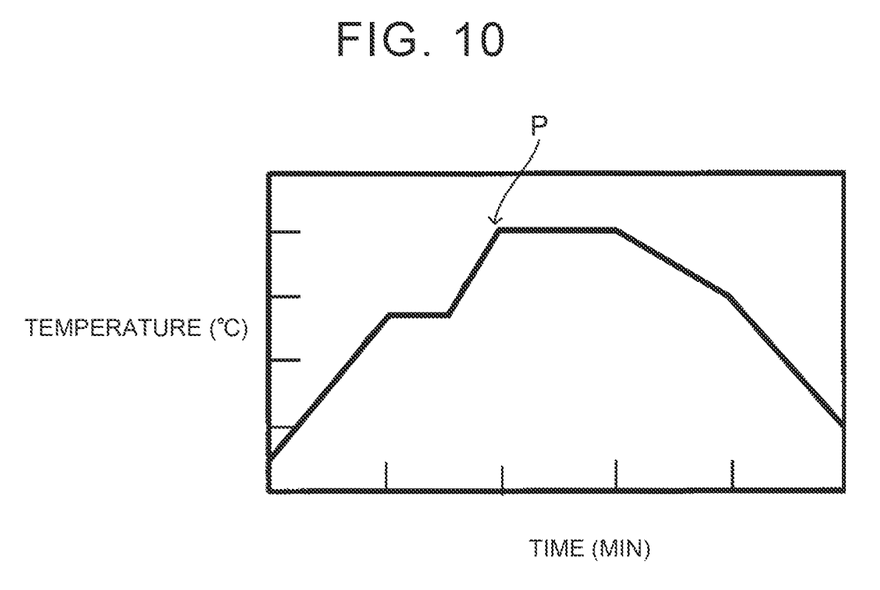
FIG. 10 is a graph illustrating an example of the timing of starting current application.

The timing of applying a current to the metal wire 13b for heating is not particularly limited, but the current application can be started when the resin composition reaches its maximum exothermic curing temperature. Specifically, a temperature sensor is placed in advance on the liner 11 in order to obtain the relationship between time and temperature as shown in FIG. 10. The current application (heating) can be started when the resin composition reaches the maximum temperature P in FIG. 10. Facilitation of curing can thus be started after confirming that the fiber layer 13 has been impregnated with the resin composition enough for heat to be conducted to the liner 11 side. The impregnation is therefore more reliably performed.

Step S15 of Releasing Preform

In step S14, the resin composition is cured. Specifically, the resin composition with which the fiber layer 13 has been impregnated is cured. In the subsequent step S15 of releasing the preform 30 (hereinafter also referred to as "step S15"), the resin-impregnated preform 30 is released from the mold 45. In the present embodiment, the preform 30 is released from the mold 45 by opening the mold 45 by separating the upper mold 46 from the lower mold 47.

Effects Etc.

The resin-impregnated preform 30 is produced by the manufacturing method including the steps described above. A high-pressure tank is manufactured by further forming a resin-impregnated glass fiber layer on the resin-impregnated preform 30 etc.

According to the present disclosure, for impregnation of the fiber layer with a resin by the RTM impregnation technique, the metal wire such as a copper wire is wound around a part of the carbon fiber layer in the inner layer side of the fiber layer by the multiple FW machine to form a heating coil. Accordingly, the fiber layer can also be heated from the inner layer side during impregnation with the resin. Both rapid impregnation and rapid curing can thus be achieved. That is, the fiber layer is impregnated with the resin by causing the resin composition to flow in the fiber layer at a low temperature (low viscosity), and the resin composition in the outer layer side is cured by the heat from the mold, and the resin composition in the inner layer side is cured by the heat from the induction-heated fiber layer. Both rapid curing and reliable impregnation are thus achieved, and a high performance, high quality high-pressure tank can be manufactured with reduced cost.

In the present embodiment, since the heating coil formed by the metal wire is a coil for induction heating, the entire fiber layer can be heated.

1.4. Second Manufacturing Method

A high-pressure tank manufacturing method S20 according to another embodiment will be described. The high-pressure tank manufacturing method S20 is different from the high-pressure tank manufacturing method S10 described above with reference to FIG. 5 in that the high-pressure tank manufacturing method S20 includes the step of forming a fiber layer (herein referred to as "step S21 of forming a fiber layer" for convenience) different from step S11. Since the subsequent steps S12 to S15 are the same as the high-pressure tank manufacturing method S10, description thereof will be omitted. Step S21 will be described.

Step S21 of Forming Fiber Layer

Figure 11:
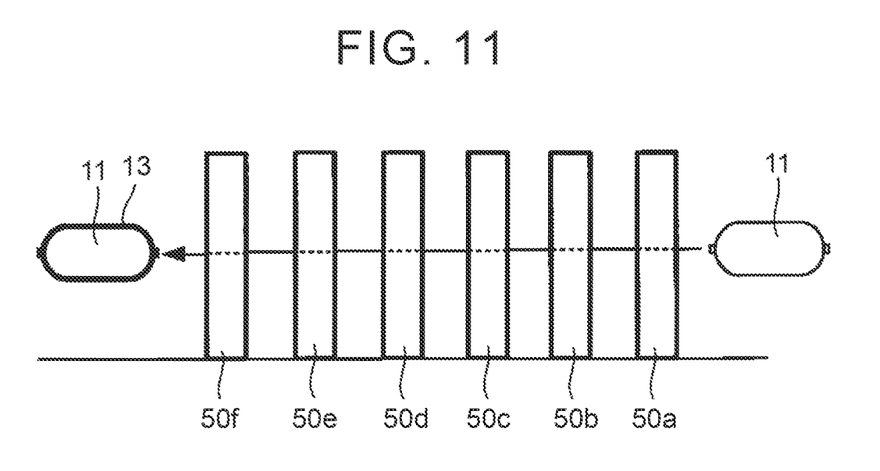
FIG. 11 illustrates step S21 of forming a fiber layer.

In step S21 for forming a fiber layer (hereinafter also referred to as "step S21"), the fiber layer 13 is formed on the outer periphery of the liner 11 to produce the preform 30. FIG. 11 illustrates step S21.

Although the fiber layer 13 is formed by the filament winding process in the present embodiment as well, the fiber layer 13 in the present embodiment is formed with a successive multiple FW machine in which a plurality of multiple FW machines are arranged. In the present embodiment, a plurality of multiple FW machines 50a to 50f are arranged as shown in FIG. 11. The individual multiple FW machines are the same as the multiple FW machine described with reference to FIGS. 6A and 6B.

In the present embodiment, the plurality of multiple FW machines is arranged so that each multiple FW machine winds a corresponding layer of the fiber layer 13. Accordingly, as shown in FIG. 11, as the liner 11 moves from right to left in the figure and passes through the multiple FW machines 50a to 50f, the first layer, the second layer, the third layer, etc. of the fiber layer 13 are sequentially wound by the multiple FW machine 50a, the multiple FW machine 50b, the multiple FW machine 50c, etc. All the layers of the fiber layer 13 are thus wound by the multiple FW machines 50a to 50f.

According to such a successive multiple FW machine, the multiple FW machine using the metal wire 13b can be fixed, and it is not necessary to change the bobbin during winding. The fiber layer 13 including the fiber bundle 13a and the metal wire 13b can thus be efficiently formed. For example, when the first layer (layer in contact with the liner 11) is desired to be a layer including the metal wire 13b, the multiple FW machine 50a of FIG. 11 includes the metal wire bobbin 41 as shown in FIG. 6A, and all the bobbins of the multiple FW machines 50b to 50f are the fiber bundle bobbins 40 as shown in FIG. 6B. In this case, it is not necessary to change the type of bobbin, and the fiber bundle 13a and the metal wire 13b can be wound efficiently.

2. Second Embodiment

A high-pressure tank and a method for manufacturing a high-pressure tank according to a second embodiment are different from the first embodiment in that a metal wire (herein referred to as the "metal wire 63b" for convenience) different from the metal wire 13b of the first embodiment is used instead of the metal wire 13b. Since the other configurations and the manufacturing method are the same as the first embodiment, only the metal wire 63b will be described.

As described above, the metal wire 13b of the first embodiment is a metal wire to which a current is applied to induction-heat the carbon fibers of the fiber bundle 13a. On the other hand, the metal wire 63b of the second embodiment is a metal wire that generates heat and heats its surroundings when a current is applied thereto. The metal wire 63b is therefore made of a conductive metal, and particularly a metal with high electrical resistance. Specifically, the metal for the metal wire 63b is preferably a material that is usually used for heating wires for heaters etc. and that has a volume resistivity of more than 5.0 μΩcm at 100° C., such as iron or stainless steel.

The sectional shape and position of the metal wire 63b can be the same as those of the metal wire 13b. However, since the metal wire 63b generates heat and heats its surroundings, the metal wire 63b need not necessarily have a helical shape (coil shape) and may have a different shape as necessary. For example, the metal wire 63b allows local heating as compared to the metal wire 13b that performs induction heating. Accordingly, the position of the metal wire 63b can be selected as appropriate. For example, in the case where it is desired to avoid heating around the caps 16, the metal wire 63b is not placed in the portions where heating is desired to be avoided. Since the metal wires 63b may be placed so as to cross each other, the amount of heat generation can be easily adjusted.

The high-pressure tank and the manufacturing method thereof according to the second embodiment have effects similar to those of the first embodiment.

What is claimed is:

1. A method for manufacturing a high-pressure tank, comprising:
   forming a preform by winding a plurality of carbon fibers around a liner to form a fiber layer on an outer periphery of the liner;
   impregnating the fiber layer of the preform with a curable resin; and
   curing the curable resin, wherein
      when winding the plurality of carbon fibers around the liner, the plurality of carbon fibers and a metal wire are sequentially fed from carbon fiber bobbins and a metal wire bobbin, respectively, wherein the carbon fiber bobbins and the metal wire bobbin are circumferentially spaced from each other and are arranged around an outer periphery of the liner, and the metal wire together with the plurality of carbon fibers are wound around the liner only before a thickness of the fiber layer reaches a half of a whole thickness of the fiber layer; and
   wherein the plurality of carbon fibers and the metal wire are wound using a single multiple filament winding machine, or wound by successively passing the liner through a plurality of multiple filament winding machines.

2. The method according to claim 1, wherein a volume resistivity of the metal wire wound around the liner is 5.0 μΩcm or less.

3. The method according to claim 1, wherein a volume resistivity of the metal wire wound around the liner is more than 5.0 μΩcm.

4. The method according to claim 1, further comprising applying a current to the metal wire after the fiber layer of the preform is impregnated with the curable resin.

5. The method according to claim 4, wherein the current is applied to the metal wire when the curable resin reaches a maximum exothermic curing temperature.

* * * * *